United States Patent [19]

Beaussant

[11] Patent Number: 4,546,491

[45] Date of Patent: Oct. 15, 1985

[54] DEVICE FOR PROTECTION AGAINST ACCELERATIONS

[75] Inventor: Raymond Beaussant, Bretigny, France

[73] Assignee: Intertechnique, Plaisir, France

[21] Appl. No.: 644,363

[22] Filed: Aug. 27, 1984

[30] Foreign Application Priority Data

Aug. 31, 1983 [FR] France ............................... 83 13975

[51] Int. Cl.[4] ............................................. A61B 19/00
[52] U.S. Cl. .................................. 2/2.1 A; 128/201.23
[58] Field of Search ............. 128/1 A, 201.23, 201.29, 128/202.11; 2/2.1 A

[56] References Cited

U.S. PATENT DOCUMENTS

| 2,335,474 | 11/1943 | Beall | 128/1 A |
| 2,475,479 | 7/1949 | Clark et al. | 128/1 A |
| 4,172,455 | 10/1979 | Beaussant | 128/201.23 |
| 4,243,024 | 1/1981 | Crosbie | 128/1 A |

*Primary Examiner*—Louis K. Rimrodt
*Attorney, Agent, or Firm*—Larson and Taylor

[57] ABSTRACT

The device, which can be used to protect the pilots of high performance aircraft against the effect of accelerations, comprises a garment having at least trousers having pockets and a control member which supplies the pockets with compressed gas when the downwardly directed acceleration of the body exceeds a predetermined threshold. The control member is adapted to establish in the trouser pockets an overpressure from a positive acceleration threshold (BC), in accordance with a substantially linear law of variation from an origin (A) corresponding to a negative acceleration. The action of the compressed gas can be supplemented by that of a liquid contained in the pockets and also subjected to the pressure of the gas.

11 Claims, 10 Drawing Figures

DEVICE FOR PROTECTION AGAINST ACCELERATIONS

BACKGROUND OF THE INVENTION

1. Field of the Invention

The invention relates to devices for protecting the members of an aircraft crew against the effect of heavy accelerations which they may undergo for a short time during a mission (for example, when manoeuvring in aerial combat) or a prolonged time (for example, during the launching of a rocket for a space flight).

2. Description of the Prior Art

The prior art devices currently used for this purpose comprise a garment, or at least trousers, having pockets and a control member which supplies the pockets with compressed gas when the downwardly directed acceleration of the body exceeds a predetermined threshold, so as to prevent blood dropping to the lower part of the body, to the detriment of the supply to the brain. The most frequently used control member, known as an "anti-g valve", is formed by a valve controlled by an inertia block which controls admission to the pockets.

This well-established method provides satisfactory results, more particularly when it uses a valve having low inertia and when the response time is reduced by the pre-inflation of the pockets at altitude (French Patent Application No. 2 395 890). To further increase the capacities of the device, use has also been made of an electric control system using as pickup an accelerometer, possibly looped by a feedback signal supplied by a probe and representing the pressure in the pockets (French Patent Application No. 2 455 765).

In a general way the existing devices are adapted to set up an overpressure in the pockets only in response to an acceleration exceeding a predetermined threshold, usually equal to about 2g, such overpressure then being increased in accordance with a linear law as a function of acceleration. In this way, operation of the anti-g device and the consumption of gas can be prevented in the case of slight acceleration, corresponding to manoeuvres which the crew can well withstand, while at the same time avoiding the inconvenience of having the garments frequently applied tightly to the body by the over-pressurization of the pockets.

However, such a method has a basic disadvantage. The irritation suffered by the wearer of the garment will never be adequately compensated when the acceleration exceeds the threshold at which triggering takes place. It is more particularly an object of the invention to provide a device meeting practical requirements more satisfactorily than the prior art, and which combines satisfactory protection with comfort during low acceleration identical to that provided by the existing devices. To this end, the invention provides a device comprising means for controlling the pressure in the pockets in accordance with a law of increasing variation from a pressure level corresponding to a threshold value of acceleration, for example, about 1.8g.

A switch can be provided to enable the wearer of the garment to pass at will from the above law of variation to a law of pressure variation remaining uniform below the threshold; the curve of variation can more particularly be linear from a negative acceleration (i.e. directed towards the brain) up to a ceiling corresponding to the minimum value of tolerable overpressure in the pockets.

A device of the kind specified can be combined with means for pre-inflating the pockets and/or overpressurizing the supply of respiratory gas, for example, of the kind disclosed in French Patent Application No. 2 395 890.

The prior art anti-g devices have another basic defect. The pneumatic pressure set up in the pockets of trousers is uniform, while the acceleration applied takes the form of a hydrostatic increase in blood pressure, which increases in the direction of application of the acceleration (i.e. as a function of the level of the body of the individual). Consequently, devices intended to enable crews to withstand the accelerations occurring with high performance aircraft impose on the crews painful and tiring pressures to compensate the hydrostatic increase in the lower zones of the body. The fact that the pockets are not provided over the whole zone of the garment in contact with the limbs and that seams or folds are pressed into the muscles further increases the discomfort of the crews. It has been suggested to construct the pilot's seat so that he can stretch out, to reduce the height of the column of blood on which acceleration acts during flattening out or steep banking. However, this solution gives only small advantages, at the price of serious disadvantages.

Basically, one solution to the problems of giving protection against acceleration would consist in immersing the crew in liquid, acceleration causing a variation in the external hydrostatic pressure which compensates the effect on the blood at each level. In fact, centrifuge tests have shown an appreciable increase in tolerance to acceleration, enabling more than 15g to be tolerated for periods exceeding several minutes. However, it is clearly unrealistic to transfer this approach to an aircraft or space vehicle. Similarly, it appears at first sight that the use of a garment, or at least trousers having pockets subjected to hydrostatic pressure, is out of the question, since it would mean taking on board a considerable weight of water and the abandonment of the necessary pressurization during high altitude flying, implying the inhalation of respiratory mixture under pressure.

It is also an object of the invention to provide a device combining the advantages of protection ensured by a column of liquid subjected to acceleration and gas pressurization, more particularly the convenience of control by an anti-g valve, while substantially obviating the respective disadvantages of the two methods.

SUMMARY OF THE INVENTION

The invention proposes more particularly a device comprising a garment having at least trouser pockets and comprising a regulator controlling the gas pressure in some of the pockets, as a function of the acceleration applies to the regulator, characterized in that it comprises means allowing the action on at least some of the pockets of the pressure of a column of water representing at least a fraction of the height of the wearer of the garment in the direction of the acceleration against which protection must be ensured.

The invention will be more clearly understood from the following description of particular embodiments of the invention, giving by way of non-limitative examples. The description refers to the accompanying drawings, wherein:

DETAILED DESCRIPTION OF THE DRAWINGS

Before describing the invention, a few facts must be recalled concerning the stress exerted on a pilot by acceleration and the principle on which anti-g trousers operate.

Figure 1:
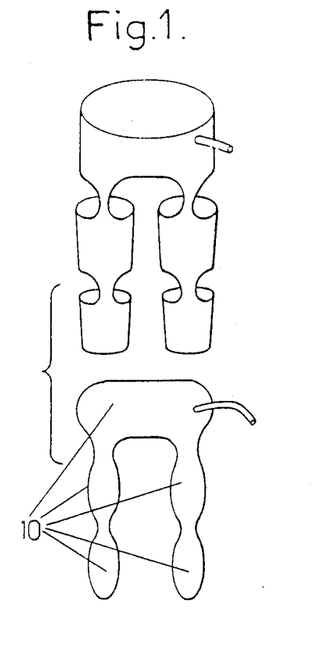
FIG. 1 is a schematic diagram showing the construction of anti-acceleration protective trousers, generally known as "anti-g trousers"

The increase in hydrostatic thrust in the blood circulation caused by an acceleration in the direction of the pilot's feet causes blood to flow and accumulate in the lower part of the body as a result of the elasticity of the vessels; moreover, the hydrostatic thrust opposes the supply to the brain from the heart. For a pilot in the seated position, the total height of the blood column to be taken into account extends from level 0 (brain) to a level about 1 m below (feet). If we suppose, and this is approximately correct, that the blood is normally distributed equally between the upper and lower halves of the body, we find that the effect of acceleration is to make about three quarters of the excess blood disappear to the lower part of the body, at the expense of the supply to the brain. This observation led to the adoption of anti-g trousers of the kind shown in FIG. 1, which have pockets in which a valve enables a gas pressure to be set up. These pockets are distributed at the level of the muscular masses, on which they exert a pressure when they are inflated.

Figure 2:
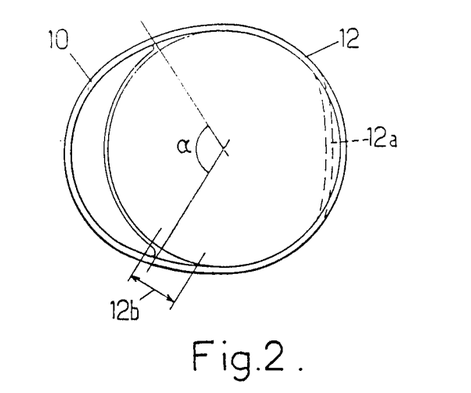
FIG. 2 is a diagrammatic section through the trousers at the level of a pocket, showing the angle subtended thereby.

In practise it is very uncomfortable to make pockets over the whole circumference of the limb. The angle occupied by a pocket 10 generally hardly exceeds 130°. The action of the pockets is exerted directly on the angle thus subtended via the tension of the fabric 12 of the trousers on the rest of the periphery of the limb. However, the effect disappears where the curvature of the fabric becomes infinite, as at 12a in FIG. 2. The same applies to the connecting zones, as 12b, and consequently the result of the performance below 1 of anti-g trousers is that the action on the limb is not equal to the gas pressure in the pockets.

Figure 3:
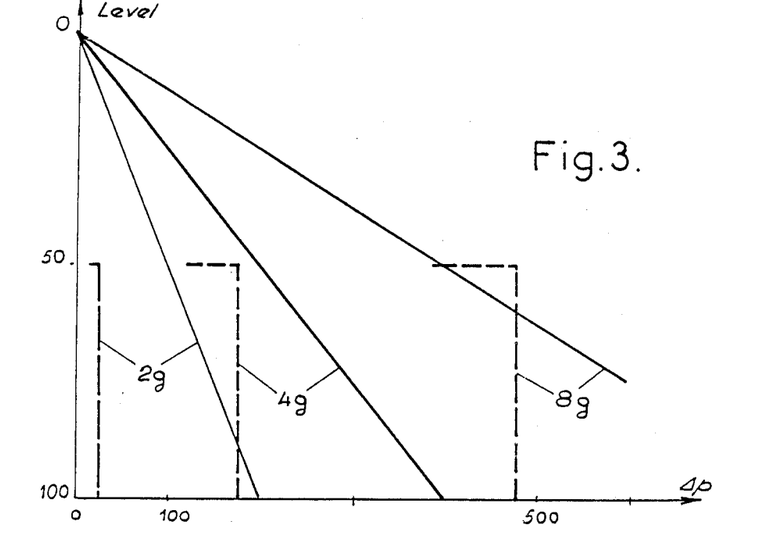
FIG. 3 shows the variation in the irritation suffered by an aviator for the different levels of the body, and the compensation provided pneumatically by a conventional anti-g device.

FIG. 3 shows the variation in blood pressure, as a function of level, undergone by a pilot (solid lines) and the gas pressure which is at present used in anti-g trousers to compensate it (chain lines) for accelerations of 2g, 4g and 8g. The law of variation in pressure as a function of acceleration $\gamma$ is shown by the line BF in FIG. 4. Up to 1.8g there is no inflation of the pockets, to prevent excessively frequent operation, which has no point, consumes gas and bothers the pilot. Beyond that value, the overpressure $\Delta p$ in the pockets increases linearly to a ceiling typically slightly above 500 mB. In principle, therefore, the compensation curve is parallel to the curve of irritation, shown in chain-dot lines for the level 75 cm in FIG. 4.

However, an examination of FIG. 3 immediately shows:

a serious deficiency in compensation, more particularly with moderate accelerations, such deficiency having hitherto been considered inevitable to avoid excessive gas consumption and trouble and pain to the pilot;

and, moreover, the inflation time of the pockets up to the required compensating pressure becomes unacceptable, due to the delay in the action of the anti-g valve, except when palliatives are used, such as those disclosed in the already cited French Patent Application No. 2 395 890 and the corresponding U.S. Pat. No. 4,230,097;

the lack of adaptation of the gas pressurization of the pockets, which is constant over their whole surface of action, to the hydrostatic pressure which increases towards the feet.

To increase toleration to accelerations and reduce the response time without appreciably complicating the usual devices, a first aspect of the invention consists in adopting a law of the kind represented by the curve ABCD (FIG. 4) under the effect of an increasing acceleration. The overpressure $\Delta p$ in the pockets is maintained at a zero value up to an acceleration threshold which may correspond to the conventional value of 1.8g, although a higher value may be advantageous in the case of the invention (which is no longer held to a compromise), then is modified in accordance with an increasing linear law whose origin corresponds to a negative acceleration, and rejoins the complete theoretical compensation curve at 75 cm (the curve in chain lines in FIG. 4) for an acceleration value close to the maximum envisaged, about 8g in the case represented in FIG. 4.

Figure 4:
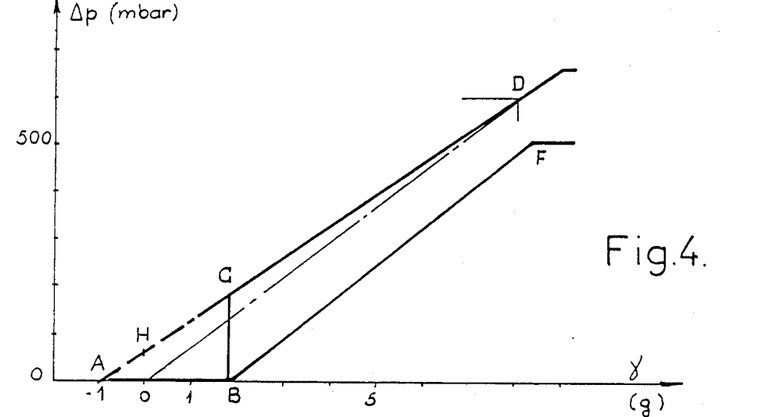
FIG. 4 shows the variation in overpressure in the trouser pockets obtained with a conventional device and a device according to one embodiment of the invention.

The device can also comprise manual control means enabling the pilot, more particularly in combat circumstances, to maintain the variation in overpressure $\Delta p$ in accordance with the line ACD. Automatic means can also be provided for passing to the line AC if a positive acceleration lower than the threshold B is maintained for a period longer than a predetermined value.

The device will advantageously be so designed so that the decrease in overpressure $\Delta p$ during the reduction of the acceleration to a zero value is performed in accordance with CA, or at least so that the return to BA is performed only with a delay, which more particularly prevents any lag if acceleration resumes, the pockets having remained pre-inflated. The line AD being above 0D, there is an excess of compensation at low accelerations, and this counteracts the delay in inflation of the pockets. During the phase of growth of acceleration, a genuine phase lead is, therefore, obtained.

The device according to the invention, using the new law of variation of pressure in the trouser pockets, is advantageously adapted to control also the inflation of waistcoat pockets at a lower pressure than the trousers pockets. To this end the device can more particularly combine with a respiratory gas supplying device, so as to increase the pressure of the respiratory mixture supplied to the pilot when he is subjected to an acceleration, while at the same time establishing the supply pressure of the respiratory mixture to the waistcoat pockets and a helmet pocket adapted to flatten the respiratory mask against the pilots face. The helmet having such a pocket can more particularly be of the kind disclosed in French Patent Application No. 2 375 873 and the corresponding U.S. Pat. No. 4,172,455.

Figure 5:
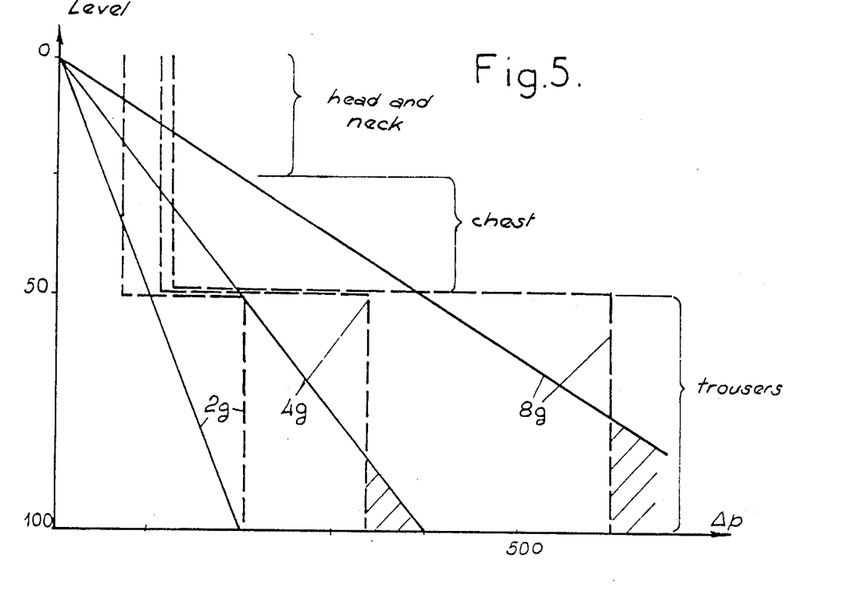
FIG. 5, which is similar to FIG. 3, corresponds to the performance of a device according to the invention having the features shown in FIG. 4.

The improvement in compensation thus obtained is shown in FIG. 5, which is similar to FIG. 3, but corresponds to an actual embodiment of the invention.

Figure 6:
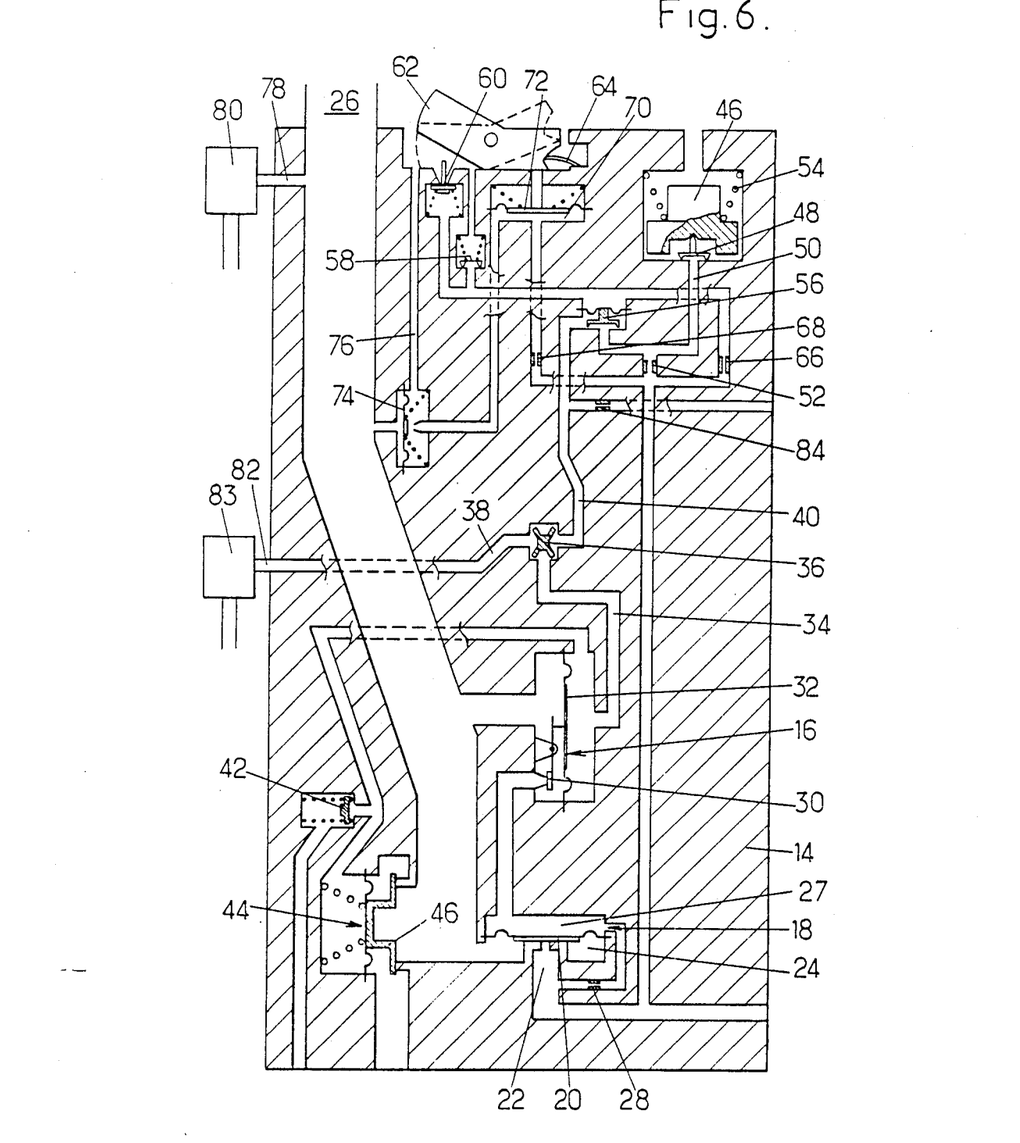
FIG. 6 is a schematic diagram of the anti-g valve of the device according to one embodiment of the invention.

A device having these characteristics can be constructed in very varied forms. FIG. 6 shows an embodiment using only mechanical and pneumatic means. However, electrically actuated gas flow control elements might equally well be used, and a data processing system supplying to such elements orders worked out from data supplied by pickups.

The device shown in FIG. 6 is intended to control the pressure in the pockets of anti-g trousers in accordance with a law of the kind shown at AD in FIG. 4. This device (FIG. 6) has a portion which is shared by the prior art anti-g valves. Consequently this portion will be described only in brief. It comprises, in a casing 14 made up of a number of assembled members, a pilot valve 16 controlling a main valve 18. The main valve is formed by a diaphragm cooperating with an annular seat 20 to control the flow of a gas (air or oxygen) from a central supply passage 22 to an annular outlet passage 24 opening into a conduit 26 connecting with the trouser pockets. The opening and closure of the main valve 18 are controlled by a variation in the pressure exerted in a compartment 27 bounded by that face of the diaphragm which is opposite the seat 20. The compartment 27 is connected to the supply via a calibrated orifice 28 and, via the closure member 30 of the pilot valve 16, to the conduit 26. The closure member is controlled by a diaphragm 32 which is also subjected on one face to the pressure in the conduit 26, and on the other face to a control pressure in a duct 34 which a double valve 36 enables to be connected to that one of two supply ducts 38 and 40 which is at the highest pressure.

The conventional portion of the device also comprises a safety valve 42 adapted to limit the control pressure applied to the diaphragm 32 of the pilot valve 16, and a compensated emptying valve 44 formed by a closure member 46 which the control pressure in the duct 34 tends to apply against a seat bounding a passage of communication from the conduit 26 to atmosphere.

Like many conventional devices, the device according to the invention shown in FIG. 6 comprises an inertia member 46 which can slide in a recess in the casing 14 in a direction parallel with that of the accelerations to be compensated. The inertia member supports a valve 48 closing the discharge into the recess of a duct 50 connected to the supply passage 22 via a calibration member 52. The recess being connected to atmosphere, the pressure in the duct 50 varies in dependence on the degree of opening of the valve 48.

While in the conventional devices a spring is provided to open the valve when the inertia block is subjected only to an acceleration below a threshold (1.8g, for example), on the contrary in the device according to the invention the spring 54 exerts on the inertia block 46 a force which tends to apply the valve 48 to its seat. In the absence of acceleration, the equilibrium overpressure which is set up in the duct 50 is therefore determined by the prestressing of the spring 54 (point H in FIG. 4). The variation in overpressure as a function of acceleration will be determined by the weight of the inertia block and the flow section offered by the calibrated orifice 52. The position of the point A is defined by the force of precompression of the spring 54.

The duct 50 is connected via a balancing valve 56 to the supply duct 40 of the double valve 36. The supply conduit 22 is connected to two valves 58 and 60 opening into the atmosphere of the cabin via a calibrated orifice 66. The valve 58 is calibrated to open and cause the opening of 56 for an overpressure in the duct 50 corresponding to the threshold C in FIG. 4. The valve 60 is manually controlled via a rocker 62 to which a laminar spring 64 gives two stable equilibrium positions. In the position shown in solid lines in FIG. 6 the rocker 62 releases the valve 60, which is kept closed by its spring. When the rocker is in the position shown in chain lines it keeps the valve 60 open.

When the valve 60 is closed, the balancing valve 56 is subjected to a pressure maintained via the calibrated orifice 66 and fixed by the valve 58. On the other hand, when the valve 60 is opened, the pressure applied to the balancing valve 56 is the cabin pressure. In that case the valve 56 opens and the control pressure in the duct 50 is transmitted to 40, 34 and acts on the diaphragm. The jet 84 had a section distinctly smaller than that of the jet 52, so as not to disturb regulation. Its purpose is merely to empty the supply duct 40 when the valve 56 is closed again.

The rocker 62 shown is adapted to be controlled either manually or automatically when acceleration reaches the value corresponding to point B in FIG. 4. For this purpose the device comprises a further branch from the supply conduit, having a calibrated orifice 68 and supplying a chamber 70 also connected to atmosphere via a valve 74 which can be considered as a storage member. The chamber 70 is bounded by a moveable unit 72 comprising a push rod which actuates the rocker 62 when the pressure in the chamber 70 exceeds the threshold corresponding to the segment BC in FIG. 4. The storage valve 74 comprises a closure member acted upon by a serial control spring which tends to separate it from its seat, to bring the chamber 70 into communication with cabin atmosphere via duct 76. The closure member of the valve 74, which is either "on or off", is subjected to the pressure in the conduit 26 for connection with the trousers in a direction tending to apply it against its seat.

Lastly, the device shown in FIG. 6 is adapted to cooperate with the respiratory gas supply regulating member. To this end it comprises an outlet 78 of the conduit 26 adapted to act via a pressure divider 80 on the overpressure stage of the regulating member, so as to produce a respiratory overpressure which increases as a function of acceleration beyond a threshold. The double valve 36 is adapted to receive via the duct 38 a pre-inflation order coming, possibly via a pressure multiplier 83, from the respiratory gas supply control member.

The device just described operates as follows.

During normal flight, as long as the acceleration does not exceed 1.8g, leakage through the calibrating member 52, which is dimensioned in relation to the weight of the inertia block 46, the surface of the valve 46 and the stiffness of the spring 54, generates an overpressure in accordance with the law AC in FIG. 4. However, such overpressure is not transmitted to diaphragm 32 of the pilot valve 16, since the balancing valve 56 remains closed and the duct 40 is always connected to atmosphere via a calibrated orifice 84, with a flow section much smaller than that of the calibrated orifice 52. The calibrated orifice 66 associated with the valve 58 maintains at the balancing valve 56 a closure overpressure for the valve 56.

To pass from the law ABC to the law AC it is enough for the pilot to press on the rocker 62, thus opening the valve 60. The contrapressure behind the valve 56 disappears and the valve opens. The overpressure generated in the duct 50 is transmitted to the diaphragm 32 of the pilot valve 16, the leakage via the calibrating member 84 being much smaller than the leakage via the calibrating member 52. Overpressure is then established in accordance with the curve AD, until the pilot returns the rocker to its starting position.

An overpressure is automatically established from a threshold in response to the first acceleration exceeding such threshold, 1.8g in the case illustrated. The overpressure appearing in the duct 50 exceeds the blocking pressure generated by the calibrated orifice 66 and the valve 58 and exerted on the balancing valve 56. That valve opens and operation is established in accordance with CD. Moreover, when the acceleration exceeds a threshold determined by the stiffness of the spring acting on the detector 74 (such threshold corresponding to BC or being different), the storage pressure detector 74 closes the connection of chamber 70 to atmosphere. Pressure rises in such chamber because of the supply of gas via the calibrated orifice 68. The moveable unit 72 moves the rocker 62 into the position shown in chain lines, and this can be considered as an automatic storage of the curve ACD. The return to the curve ABCD can be performed either manually (FIG. 6), or with a time delay.

Figure 7:
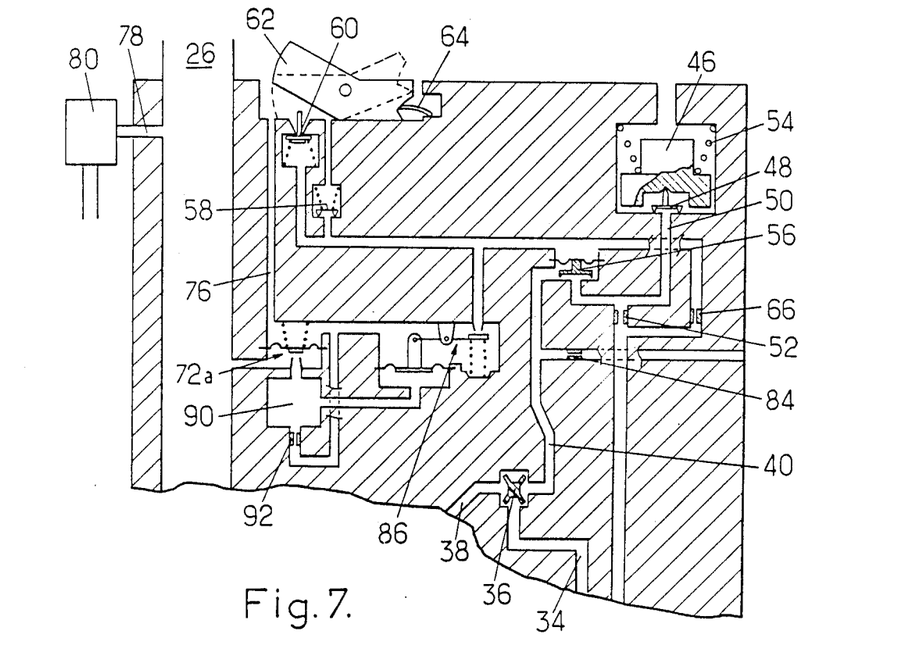
FIG. 7, which is similar to a portion of FIG. 6, shows a variant embodiment.

FIG. 7, in which like members to those in FIG. 6 have like references, shows such a variant embodiment. It comprises a diaphragm valve 86, which, when opened, applies the atmospheric pressure coming from the duct 76 to the valves 56, 58 and 60. The diaphragm is acted upon by the control pressure in a compartment 90 forming a buffer volume connected via a calibrated orifice 92 to the duct 76 and via a pressure-detecting valve 72a to the conduit 26 supplying the pockets. The valve 72a comprises a return spring which retains the valve closure member on its seat as long as the pressure in the pockets remains lower than the pressure corresponding to the point C (200 mbar, for example). The diaphragm valve 86 is adapted to remain closed as long as the pressure in the compartment 90, forming a buffer volume v, remains lower than a predetermined value, for example, 30 mbar.

Such an arrangement ensures a time delay before return to the curve ABC, formed by the time taken by the compartment 90 to pass from a pressure of 200 mbar to a pressure of 30 mbar, for example, (the operating threshold of the diaphragm valve 86), due to the flow through the bleed 92.

When the acceleration drops below the threshold provided, for example, 2g, therefore, the pressure in the passage 26 decreased below 200 mbar, and the valve 72a closes, isolating the compartment 90 from the passage 26. The pressure in the compartment then progressively diminishes, and the valve 86 closes as soon as the pressure no longer exceeds 30 mB. In its turn, the opening of the valve causes the closure of the balancing valve 56 and the isolation of the pilot valve 16. The volume v of the compartment 90 and the constriction 92 are designed to obtain the required delay, generally of about 30 seconds.

The modification of a prior art device to obtain a law of the kind shown in FIG. 4 in itself adds substantially to the protection of the pilot. However, it still leaves the second problem mentioned above, namely the impossibility of using a constant pneumatic pressure to compensate for the effect, increasing in accordance with the level, of a hydrostatic column.

This second difficulty is to a large extent obviated by combining the effect of pneumatic pressure with that of a hydrostatic pressure. Basically, satisfactory compensation might be obtained in the lower part of the body by using the arrangement diagrammatically illustrated in FIG. 8, comprising a reservoir 93 attached to the seat, connected by two sections of tubing joined by a self-closing connecting member 95 to the pockets in the protective trousers of the pilot 97.

Figure 8:
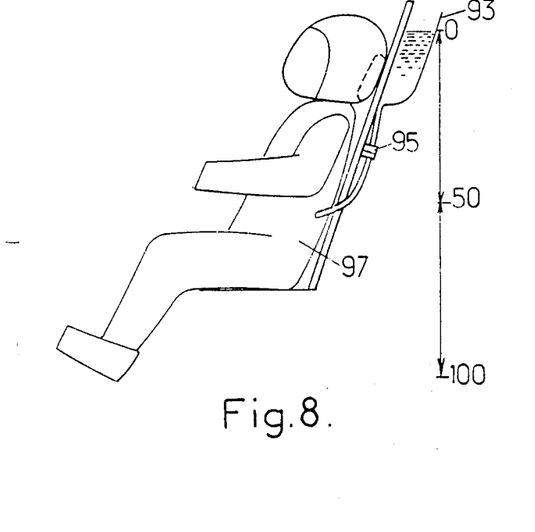
FIG. 8 illustrates the principle of compensating hydrostatically for accelerations.

However, it is difficult to provide an expansion vessel 93 of adequate volume, resistant to accelerations, on the seat. The absence of a pneumatic valve prevents a controlled gaseous pressure from being set up in the pilots jacket to protect him. Lastly, all the trouser pockets must be filled with water, as well as the expansion vessel, and this means that a considerable mass, exceeding about ten kilograms, must be taken on board. This method, although less advantageous than that which will now be described, is not to be rejected, since it enables the law 0D in FIG. 4 to be obtained without any delay.

Figure 9:
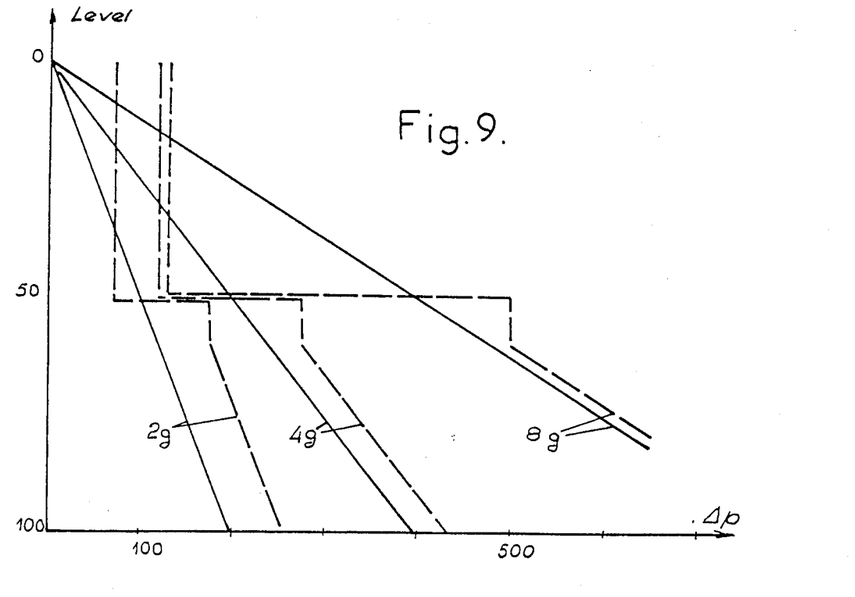
FIG. 9, which is similar to FIGS. 3 and 5, illustrates the operation of a second embodiment of the invention.

The invention obviates these difficulties by bringing a pneumatic pressure and a hydrostatic pressure into action simultaneously. A first method of achieving this consists in using pockets separated by a flexible wall into a water compartment and an air compartment. As a result of such an arrangement, it is possible to obtain a law of variation of overpressure as a function of level, of the kind shown in FIG. 9. A comparison with FIG. 3 shows that the overpressure ensured by the water in the pockets predominates over the pneumatic pressure in the whole of the lower part of the trousers and corresponds to complete compensation. Due to the use of an anti-g valve to control the pneumatic pressure, it is possible also to achieve a reduced overpressure of the mixture for breathing and supplying the pockets of the jacket to complete protection.

Figure 10:
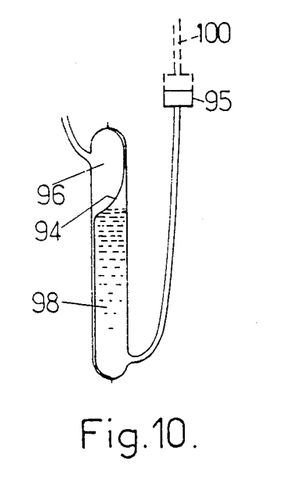
FIG. 10 is a basic diagram showing a possible construction of the trouser pockets for the purposes of the second embodiment of the invention described.

The trouser pockets can be made up as shown diagrammatically in FIG. 10. A partition 94 separates the thickness of the pocket into an air compartment 96, connected to the anti-g valve, which can have the construction shown in FIG. 6, and a water compartment 98. Means for filling all the water compartments are shown diagrammatically in FIG. 10 in the form of a shared conduit having a self-closing connecting member 92. The pockets can be filled before the flight by connection to a supply 100 which is then disconnected. Emptying can be carried out after flight by completely pressurizing the gas pockets. Of course, it is possible not to use hydrostatic compensation, more particularly for flights on which a high degree of protection against accelerations is not required.

The advantages of the method which has just been described are immediately apparent. There is less delay in inflating the trouser pockets and less gas is consumed. Compensation increases at the same time as acceleration, even when the latter exceeds the ceiling adopted for the gas overpressure. In comparison with a purely hydrostatic method, the invention reduces the mass of water to be taken on board to a few kilograms, allowing the control of the overpressure in the jacket and any overpressure of a helmet pocket (thus guaranteeing the behaviour of the mask under a load factor), and that of the respiratory mixture.

The invention is clearly capable of numerous variants. For example, to take into account the presence of water in the trouser pockets, the trousers can be connected to the seat. Different pockets can be provided for water and gas. The invention can be applied in cases of both electronic and pneumatic control, and also be combined with the teaching of the patents cited hereinbefore.

What is claimed is:

1. A device for protection against the effect of accelerations, comprising:
    (a) a garment having at least trousers having pockets; and
    (b) a control member which, in use, supplies compressed gas to the pockets when the downwardly directed acceleration of the body exceeds a predetermined threshold,
    wherein the control member includes a means for setting up in the trouser pockets an overpressure when the predetermined positive acceleration threshold is exceeded in accordance with a substantially linear law of variation having an origin corresponding to a negative acceleration.

2. A device according to claim 1, wherein the acceleration threshold is of the order of 1.8g.

3. A device according to claim 1, wherein the slope of the law of variation and the value of the overpressure immediately after the acceleration threshold has been exceeded are selected to ensure a substantially complete compensation of the effects of acceleration.

4. A device according to claim 1, wherein at least one trouser pocket is separated by a flexible partition into a compartment connected to such member and a compartment adapted to contain a liquid, such as water.

5. A device according to claim 1, further comprising manually controlled switching means for enabling the substantially linear law of variation to be brought into effect below the threshold.

6. A device according to claim 1, further comprising manually operable means allowing the suppression of the portion of the increasing substantially linear law below the threshold.

7. A device according to claim 1, further comprising automatic means operable to suppress the portion of the increasing substantially linear law below the threshold.

8. A device according to claim 1, further comprising means for applying an overpressure, reduced in relation to that in the trouser pockets, to the respiratory mixture in jacket pockets and/or in a helmet pocket adapted to flatten the mask against the face of the wearer.

9. A device according to claim 1, wherein the control member comprises an inertia block associated with a pilot valve and subjected to the action of resilient means acting in the direction of valve closure.

10. A device for protection against the effect of acceleration on a crew member, comprising:
    (a) trousers having trouser pockets, some at least of the pockets being separated by a flexible partition into a first compartment and a second compartment;
    (b) a regulator for controlling a gas pressure in said first compartment, in dependence of acceleration against which protection is to be ensured; and
    (c) means for maintaining a body of liquid in said second compartment under a static pressure representing a fraction of the height of the wearer of the trousers in the direction of said acceleration.

11. A device according to claim 10, further comprising a jacket provided with pockets, the pockets of said jacket being in communication with said regulator which is so arranged as to deliver a pressure to said pockets in said jacket lower than the pressure in said pockets of said trousers.

* * * * *